United States Patent [19]

Lederman

[11] Patent Number: 4,714,803

[45] Date of Patent: Dec. 22, 1987

[54] OVERRUNNING CLUTCH WITH SEALING MEMBER

[75] Inventor: Frederick E. Lederman, Sandusky, Ohio

[73] Assignee: General Motors Corporation, Detroit, Mich.

[21] Appl. No.: 876,771

[22] Filed: Jun. 20, 1986

[51] Int. Cl.⁴ ............................................. F16D 15/00
[52] U.S. Cl. ................................... 192/41 R; 192/45; 192/113 B
[58] Field of Search ...................... 192/41 R, 41 A, 42, 192/43, 43.1, 43.2, 44, 45, 45.1, 45.2, 113 B

[56] References Cited

U.S. PATENT DOCUMENTS

| | | | |
|---|---|---|---|
| 3,175,661 | 3/1965 | Maurer et al. | 192/45.1 |
| 4,236,619 | 12/1980 | Kuroda | 192/45 |
| 4,291,795 | 9/1981 | Charchian et al. | 192/113 B |

Primary Examiner—George H. Krizmanich
Attorney, Agent, or Firm—Patrick M. Griffin

[57] ABSTRACT

An overrunning clutch contains a sealing member that radially floats along with a cage of the clutch in order to maintain the sealing member in an equilibrium sealing condition relative to an eccentrically moving clutch race, thereby blocking lubricant leakage without increasing friction.

3 Claims, 8 Drawing Figures

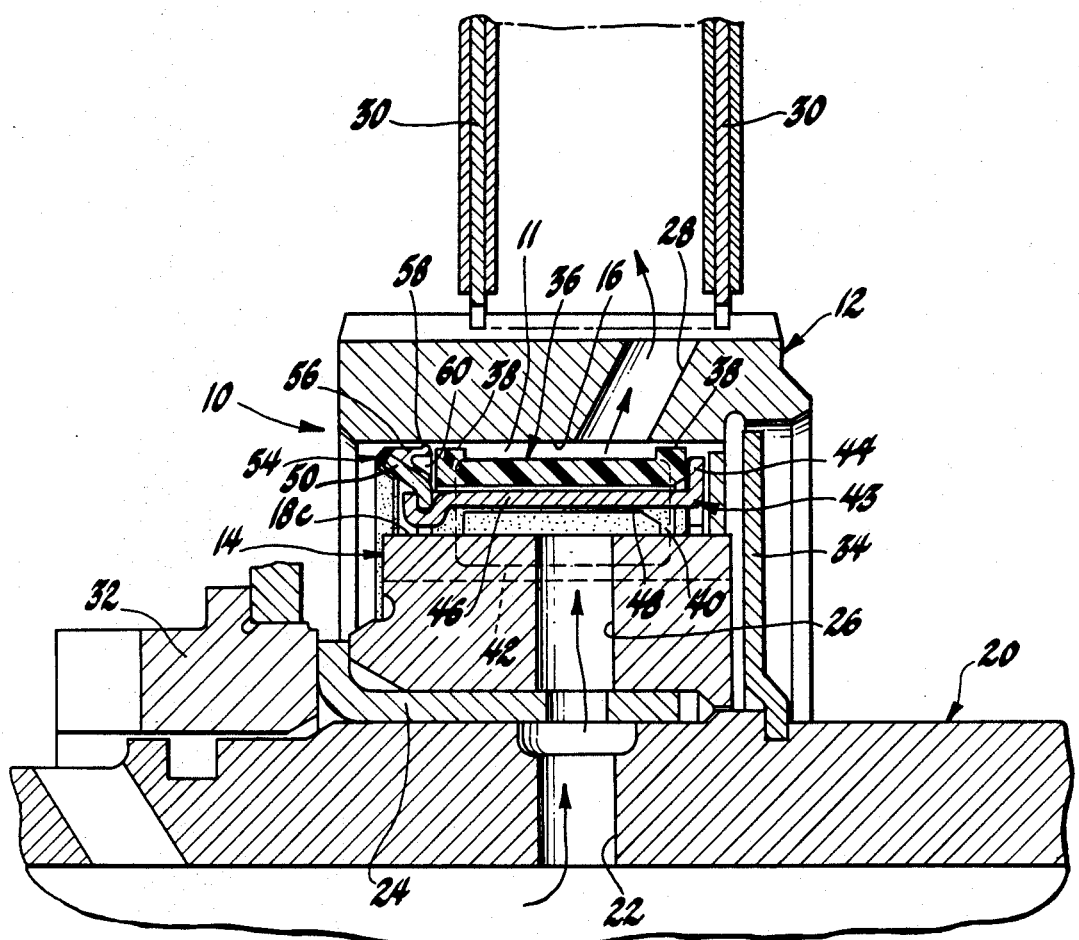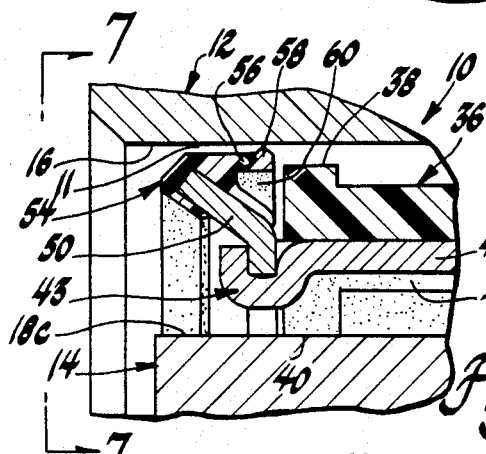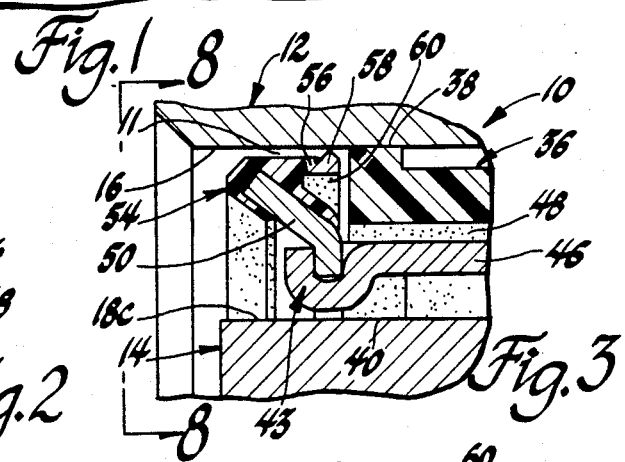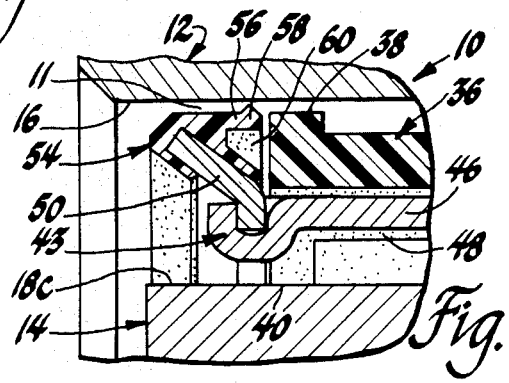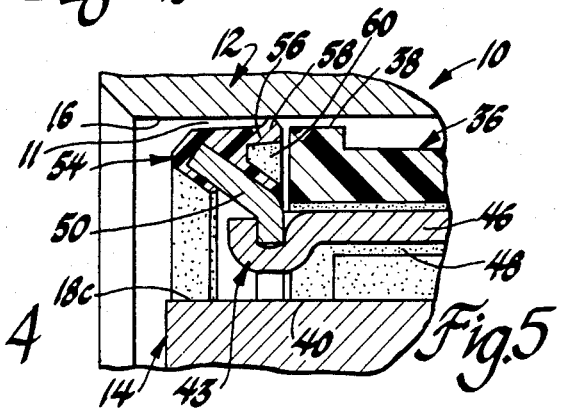

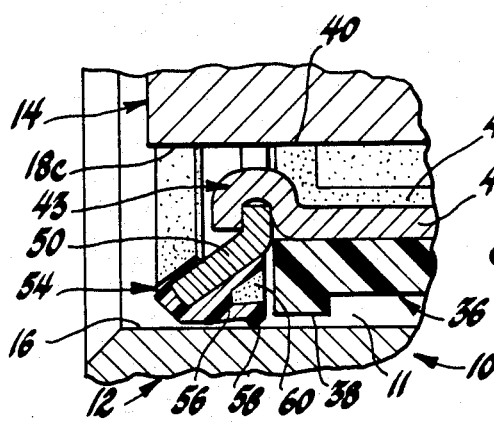
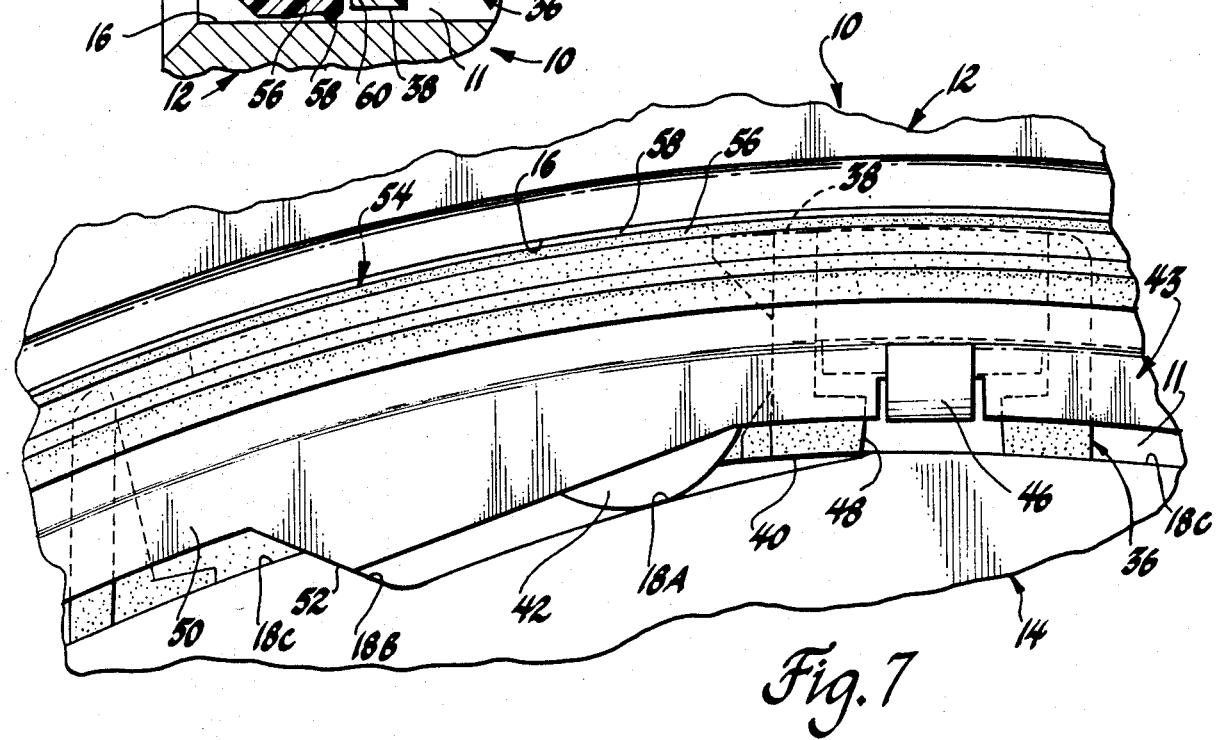
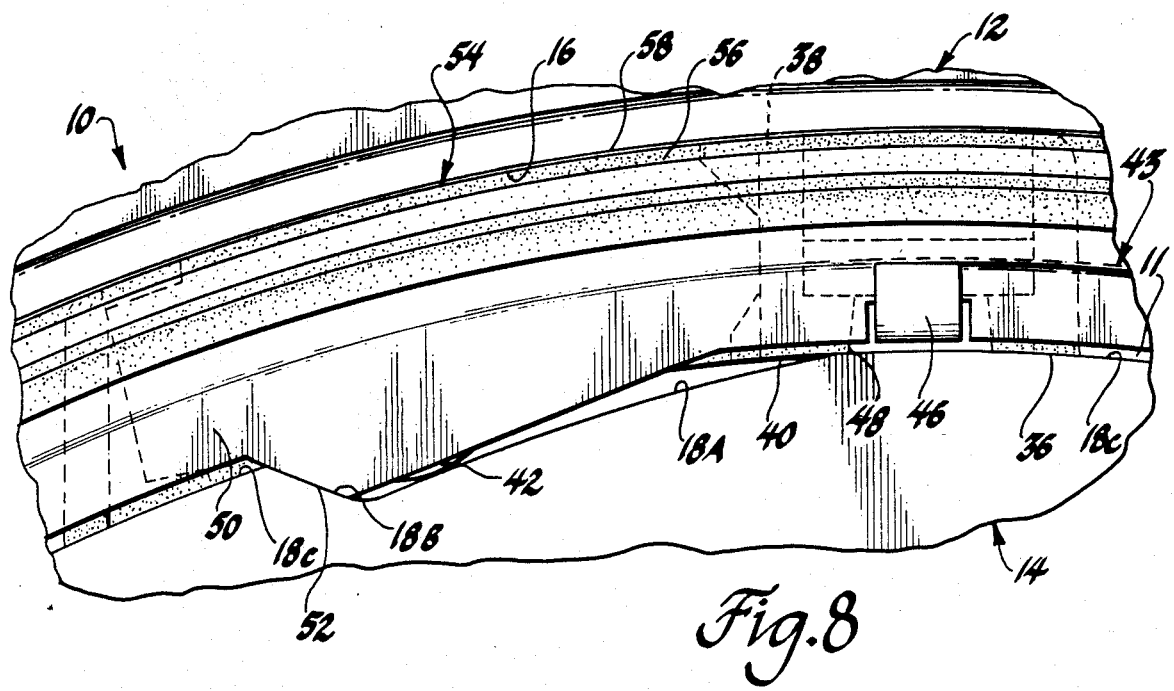

OVERRUNNING CLUTCH WITH SEALING MEMBER

This invention relates to overrunning clutches in general and specifically to an overrunning clutch that has an improved low friction means for confining lubricant within an annular space between a pair of clutch races.

BACKGROUND OF THE INVENTION

Overrunning clutches, sometimes referred to as roller clutches or one-way brakes, find many applications in automotive vehicles. Typically, an overrunning clutch operates in an annular space between relatively rotatable inner and outer clutch races. A plurality of wedging elements, most often cylindrical rollers, are retained by a clutch cage installed within the annular space. In most applications, an overrunning clutch will operate in an environment where there is no need to provide any kind of seal to confine a lubricant within the annular space, as is typically done for a bearing.

However, there is one automotive application for an overrunning clutch that requires a structure to confine a lubricant to or within the annular space between clutch races. A typical vehicle automatic transmission includes a multi-plate fluid operated friction clutch, not to be confused with the overrunning clutch. The friction clutch generally includes a plurality of interleaved friction disks and steel plates which surround the outer race of the overrunning clutch. The inner or cam race is journaled on the transmission shaft, and forms an annular space with the outer race. A cage, which retains a plurality of cylindrical rollers, is installed in the annular space between the races. The overrunning clutch acts as a shift timer to improve the smoothness of the transmission's shifting. This location of the overrunning clutch saves axial space but also presents a problem. When the disks and plates of the frictin clutch are disengaged, they rotate very rapidly relative to one another with a very small clearance. Without a lubricant between them, a great deal of heat and wear would be generated. Therefore, the transmission must continually supply lubricant between the disks and steel plates when the friction clutch is disengaged, which is generally supplied from a port in the transmission shaft. Because the overrunning clutch is, in effect, in the way, that lubricant must go radially outwardly through it. After exiting the shaft, the lubricant is directed radially outwardly through a port in the inner race, through the annular space between the races, and finally out through a port in the outer race and finally to the disks and plates. The force with which this lubricant is outwardly directed is primarily centrifugal and dependent on the speed of rotation of the outer race, which may be quite high. Seeking the path of least resistance, this lubricant will attempt to exit axially through the sides of the annular space between the races. Unless that annular space is somehow blocked, adequate lubricant may not reach the friction clutch.

Confining the lubricant presents unique problems in the context of the overrunning clutch, problems not found in the context of a rolling element bearing. While a bearing also includes inner and outer annularly spaced races, the operation of a bearing is quite different. In a bearing, the rolling elements are very closely confined between annularly spaced pathways on the inner and outer races. Consequently, it is simple to maintain the bearing races very closely coaxial to one another. With a typical overrunning clutch, however, the clutch races can not be so easily maintained in close coaxial relation, at least without the use of separate bearings, which is undesirable for cost and space reasons. A typical overrunning clutch maintains the clutch races coaxial with cage journal blocks, not with a separate bearing. Such a clutch is generally referred to as a concentric control clutch. The journal blocks fit closely within and maintain the annular space between the clutch races, thereby keeping the clutch races substantially coaxial. The journal block fit is purposely designed to have a certain amount of tolerance or looseness, however, significantly greater than the tolerance with which rolling bearing elements fit between bearing race pathways. This is deliberately done to ease the installation of the case assembly between the clutch races, which involves pushing the cage assembly into the annular space. A running eccentricty of the outer race occurs because of the deliberate tolerance in the journal block fit. In the environment of a high speed automatic transmission, the running eccentricity can cause the annular space between the clutch races to change size thousands of times a minute.

The running eccentricity makes it impractical, if not impossible, to apply typical bearing seal technology to the problem of confining a lubricant between the clutch races. A convention bearing seal includes some type of support, such as a snap shield, attached to one bearing race with an elastomer seal lip that rubs on the other race. While a conventional rubbing seal works well with a bearing, since the races are held very closely coaxial, such a seal in an overrunning clutch would experience an increase in friction with every cycle of the running eccentricity, and could be rubbed away. Therefore, current overrunning clutches used in such an environment settle for a labyrinth seal, which are very low friction, but which, of course, cannot provide the complete confinement of the lubricant that a rubbing seal would provide. It would be desirable, if possible, to provide a means that more completely blocked the loss the lubricant out of the annular space that does a labyrinth seal, but without the high friction of a conventional rubbing seal, especially for application in a vehicle automatic transmission.

SUMMARY OF THE INVENTION

The subject invention provides such an improved lubricant confining means for an overrunning clutch. The invention overcomes, and in fact takes advantage of, those unique features of an overrunning clutch that prevent the use of a conventional seal.

The invention is disclosed in an overrunning clutch that is adapted to be installed in the annular space between a pair of relatively rotatable clutch races, an inner cam race and an outer race with a cylindrical surface thereon. The clutch includes a plurality of journal blocks that fit within the annula space with a deliberate tolerance, thereby allowing the outer race to rotate with a running eccentricity about the race coaxis. In the environment disclosed, which is a vehicle automatic transmission, the clutch races are located radially between the plate-disk stack of a friction clutch and the transmission shaft. Therefore, a lubricant must pass through the annular space between the clutch races. The lubricant is centrifugally forced radially outwardly and ultimately through the outer clutch race to the plate-disk stack. The lubricant must be prevented from exiting through the axial side of the annular space to assure that an adequate supply reaches its proper destination.

The preferred embodiment includes a clutch cage having a generally annular first side rail with cross bars that pass though oversized slots in the journal blocks and a generally annular second side rail which is crimped to the ends of the cage cross bars, axially spaced from and parallel to the first side rail. The oversized slots are sufficiently large to allow the cage to radially float within the annular space by an amount at least equal to the running eccentricity of the outer race. The second side rail is located near and substantially fills one side of the annular space so as to substantially block lubricant loss, but does not extend radially outwardly far enough to rub on the eccentrically moving cylindical surface of the outer race.

An elastomer sealing member is supported by the second side rail and includes a substantially cylindrical wall flexibly cantilevered to the second side rail and extending axially inwardly into the annular space along the cylindrical surface of the outer race. This cylindrical wall is normally spaced from the cylindrical surface with a clearance sufficient to prevent rubbing friction, but small enough so that the cylindrical wall will be sealingly engageable with the cylindrical surface to further block lubricant loss in cooperation with the second side rail. Furthermore, for the embodiment disclosed, that clearance is also sufficiently small that the sealing member cylindrical wall can pilot on the eccentrically moving outer race cylindrical surface. Since the sealing member is supported by the second side rail, it can radially float with the cage, and a substantially constant clearance is thereby maintainable between the cylindrical wall and the outer race cylindrical surface. The constant clearance that is maintained substantially prevents the cyclical increase in rubbing friction that would result from the outer race running eccentricity if a conventional sealing member were used.

In addition, in the preferred embodiment, the cylindrical wall of the sealing member forms a lubricant capturing chamber in cooperation with the second side rail. The clearance between cylindrical wall and cylindrical surface is also sufficiently small that the wall can be flexed into stronger sealing engagement with the cylindrical surface of the outer race by the centrifugally forced lubricant that is captured in the chamber. Thus, the sealing force, and the rubbing friction caused thereby, is greatest when the sealing force is most needed, that is, when the lubricant is under the greatest force and most likely to leak.

It is, therefore, a generaly object of the invention to provide an overrunning clutch of the type that is adapted to be installed in an annular space between a pair of relatively rotatable and substantially coaxial races with a lubricant in the annular space that has an improved means for confining that lubricant within the annular space, a means which operates with low friction in spite of a running eccentricity in one of the races.

It is another object of the invention to provide such an improved means that includes a clutch cage adapted to be installed to the other of the races so that a portion of the cage may radially float within the annular space by an amount at least equal to the running eccentricity, and which also includes a generally annular support member joined to the cage portion near one side of the annular space so as to move with the cage portion and sized so as to substantially block the flow of the lubricant through the one side of the annular space without rubbing on the cylindrical surface, and which also includes a sealing member joined to the support member and sealingly engageable with the cylindrical surface so as to further block the flow of lubricant from the side of the annular space in cooperation with the support member, so that the sealing member, by virtue of being joined to the support member, is also able to radially float and thereby engage the eccentrically moving cylindrical surface in such a way as to prevent an increase in rubbing friction from the running eccentricity.

It is yet another object of the invention to provide an improved means of the type described in which the sealing member includes a substantailly cylindrical wall normally spaced from the one race cylindrical surface with a clearance sufficiently great to substantially prevent rubbing friction therewith, but sufficiently small that the wall can pilot on the cylindrical surface of the one race as it eceentrically moves so that the cylindrical wall can, by virtue of being joined to the support member, also radially float and maintain a substantially constant clearance from the eccentrically moving cylindrical surface, thereby preventing an increase in rubbing friction from the running eccentricity.

It is still another object of the invention to provide such an improved means for use in an environment where the lubricant is directed radially outwardly through the annular space and through an outer clutch race, and in which the cylindrical wall of the sealing member is flexibly cantilevered to the support member and extends axially inwardly along a cylindrical surface on the outer race so as to form a lubricant capturing chamber, whereby the cylindrical wall can be flexed into sealing engagement with the cylindrical surface by the force of the lubricant captured in the chamber.

DESCRIPTION OF THE PREFERRED EMBODIMENT

These and other objects and features of the invention will appear from the following written description of the preferred embodiment and the drawings in which:

FIG. 1 is a cross-sectional view of a portion of an overrunning clutch incorporating the invention installed between a pair of inner and outer clutch races located between the shaft and the friction clutch of an automatic vehicle transmission, and showing the races in a nominally coaxial relation with a lubricant flow path indicated by arrows;

FIG. 2 is an enlargement of a portion of FIG. 1 showing the high point in the running eccentricity of the outer race;

FIG. 3 is a view similar to FIG. 2, but showing the low point in the eccentricity;

FIG. 4 is an enlargement of the same portion of FIG. 1 and showing the location of the sealing member when lubricant is being directed radially outwardly either not at all, or with a small force;

FIG. 5 is a view similar to FIG. 4, but showing the location of the sealing member when lubricant is being directed radially outwardly with a greater force;

FIG. 6 is a view of that portion of the overrunning clutch diametrically opposed to that portion shown in FIGS. 2-5, but showing the races in a nominally coaxial relation and showing a position of the sealing member caused by forces other than the running eccentricity of the outer race;

FIG. 7 is a view taken along the line 7—7 of FIG. 2;

FIG. 8 is a view taken along the line 8—8 of FIG. 3.

Referring first to FIGS. 1 and 7, an overrunning clutch or roller clutch incorporating the invention is designed generally at 10. The overrunning clutch 10 is the type that is installed in the annular space 11 formed between a pair of relatively rotatable races, an outer race designated generally at 12 and an inner or cam race designated generally at 14. One of the races, in this case the outer race 12, includes a cylindrical pathway or surface 16. The inner race 14 includes a surface that is also substantially cylindrical and confronts the cylindrical surface 16. As will be well recognized by those skilled in the art, the surface of the inner race 14 is not strictly cylindrical, but is comprises of a plurality of evenly circumferentially spaced sloped cam surfaces 18A, oppositely sloped, shorter cam hook surfaces 18B, and intermediate cylindrical surfaces 18C. The section depicted in FIG. 1 cuts through a cylindrical surface portion 18C.

Still referring to FIG. 1, the roller clutch 10 disclosed is used in an automatic vehicle transmission, selected structural elements of which are illustrated in FIG. 1. Such a transmission generally includes a transmission shaft, designated generally at 20. Transmission shaft 20 has a central lubricant transferring channel, one port of which is designated at 22. The inner race 14 is journaled on shaft 20 by an apertured bronze bearing 24, and is thereby maintained coaxial to shaft 20. Inner race 14 includes a plurality of lubricant ports therethrough, one of which is designated at 26. In turn, outer race 12 includes a plurality of lubricant ports, one of which is designated at 28. The vehicle transmission also includes a fluid operated friction clutch, not to be confused with the overrunning clutch 10, which includes a plurality of steel plates 30 splined to the outside of the outer race 12, the outside two of which are shown. The friction clutch would also have a plurality of friction disks, not shown, interleaved with the plates 30. The clutch races 12 and 14 and overrunning clutch 10 acts as a timer between the friction clutch and the shaft 20 to give smoother shifting, and are located radially between the plates 30 and the shaft 20 in order to save axial space. Since the interleaved plates 30 and disks will at times turn very rapidly relative to one another with a very close clearance, it is necessary that a lubricant be supplied between them to prevent excessive heat and wear. Because of the location of the clutch races 12 and 14, it is also necessary that the lubricant be directed radially outwardly through the outer race port 28 in order to reach the plates 30. For the transmission environment in which the invention is disclosed, the lubricant is directed with a centrifugal force dependent on the speed of rotation of the outer race 12, a flow designated by the arrows. It will be understood that in order for an adequate supply of lubricant to follow the desired path, it must be allowed to escape axially out of the sides of the annular space 11 between the races 12 and 14. The invention provides the necessary confinement of the lubricant in an improved, low friction manner, as will appear below.

Still referring to FIG. 1, it will be noted that the inner race 14 is axially confined on the shaft 20 by separate structure of the transmission, designated at 32 and 34, which is conventional and to further described. The axial location of the outer race 12 relative to the transmission shaft 20 would likewise be maintained by other structures of the transmission, not shown. The inner race 14 is held coaxial to the axis of the shaft 20 by the bronze bearing 24. However, the radial location of the outer race 12 relative to both the inner race 14 and the axis of the transmission shaft 20 is not maintained as closely. The radial location of the outer race 12 is maintained by a plurality of twelve evenly spaced molded plastic journal blocks, one of which is designated generally at 36. Each journal block 36 includes an upper surface 38, which in this case consists of two arcuate and axially spaced surfaces, because of the way in which the journal block 36 is molded. In addition, each journal block 36 includes a lower surface, here comprised of two arcuate and axially spaced surfaces 40. One of a plurality of 12 rollers 42 is indicated in dotted lines, but is not indicated in FIGS. 2–5 or discussed further, since the position of roller 42 is determined by forces other than those necessary to describing the invention.

When the overrunning clutch 10 overruns, the cylindrical surface 16 of the outer race 12 rides on and slides over the upper journal block surface 38, while the lower surface 40 sits on a respective inner race surface cylindrical portion 18C. Since the journal block 36 thickness, measured between the opposed surfaces 38 and 40, is substantially equal to the thickness of the annular space 11 when the surfaces 16 and 18C when the races 12 and 14 are nominally coaxial, the races 12 and 14 are maintained in substantially a coaxial relation. This feature is generally referred to a concentric control, although coaxial control would be more accurate. However, the journal block 36 thickness is deliberately made slightly less than the ideal radial separation between the surfaces 16 and 18C, a difference or tolerance typically on the order of a half to one millimeter. This tolerance is deliberately created so that the journal blocks 36 may be easily pushed between the surfaces 16 and 18C of the races 12 and 14 when the clutch 10 is installed. That tolerance of the journal blocks 36 in turn creates a running eccentricity in the outer race 12. The running eccentricity of the outer race 12 is significantly larger than that in a typical bearing, and would make it difficult or impossible to use a conventional rubbing bearing seal with the surface 16. A conventional seal could be rapidly worn away because of the running eccentricity which can reach several thousand cycles a minute in a transmission. If a conventional seal were built to be still enought to withstand the cyclical oscillations, its rubbing friction would be far too high. The invention, however, works in spite of the running eccentricity of the outer race 12.

Referring now to FIGS. 1, 2 and 7, the clutch 10 has a cage designated generally at 43, which includes a first generally annular metal side rail 44 from which are integrally bent a plurality of 12 axially extending cross bars 46. Each cross bar 46 runs through an oversized slot 48 axially through the center of a journal block 36. The cage 43 also includes a second generally annular side rail, designated at 50. Although similar in size to the first side rail 44, the side rail 50 is bent outwardly, as best seen in FIG. 2. After a journal block 36 is fitted over each cross bar 46, the ends of the cross bars 46 are crimped over the radially inner edge of side rail 50 to rigidly hold the side rails 44 and 50 parallel and axially spaced. Each slot 48 is oversized relative to the the cross bar 46, leaving a clearance that is at least equal to the journal block surface 38-cylindrical surface 16 tolerance. That clearance is, in fact, significantly greater in the embodiment illustrated. For the nominally coaxial race position of FIG. 1, the cross bar 46 is depicted as approximately centered within the slot 48. A basic objective of the oversizing of slot 48 is to compensate for the fact that the journal blocks 36 are made of plastic, which has a coefficient of thermal expansion significantly greater than metal. The bar 46—slot 48 clearance allows the cage 43 to radially float within the annular space 11, and the journal blocks 36 can thus freely expand and contract without interference from the metal cage. That same radial float is used to advantage in the invention, as will appear below.

As best seen in FIG. 7, the side rail 50 includes a plurality of sloped reaction ears 52 that match the cam hook surfaces 18B of the inner race 14. Although not illustrated, the radially inner edge of the side rail 44 includes matching reaction ears. The reaction ears 52 serve to tie the cage 43 of the clutch 10 to the inner race 14 upon installation so that the cage 43 will move only very slightly relative thereto in the circumferential direction. After installation, there is an inner radial gap between the radially inner edge of the side rails 44 and 50 and the surface of the inner race 14, a gap that is roughly equal to, and here greater than, the cross bar 46-journal block slot 48 clearance just described. That radial inner gap increases and decreases along with the eccentricity of outer race 12, and is greater in FIG. 7 that it would be in FIG. 1, for reasons explained below. While this inner radial gap appears to create a potential lubricant leak path, it is not a problem for the embodiment disclosed. It must be kept in mind that the lubricant is thrown centrifugally outwardly, and will consequently spiral out axially along the outer race cylindrical surface 16 and tend to escape axially through the radially outer gap between the side rail 50 and the surface 16, rather than the inner gap. Furthermore, the right axial side of the annular space 11 does not present a great leak problem for the embodiment disclosed, because the biase of the friction clutch piston tends to close up any gaps on the right side, and the structure 34 helps to create a labyrinth. Therefore, the invention disclosed need only deal with the left axial side of the annular space 11, although it should be kept in mind that it could easily be applied to both axial sides if desired. The invention prevents lubricant leakage out of the left axial side of the annular space 11 first of all with the second side rail 50 itself, which is large enough to substantially block the left axial side of the annular space 11. However, the side rail 50 terminates radially short of the eccentrically moving outer race surface 16, so as not to rub thereon, and would by itself provide no more than a labyrinth seal. The invention provides a sealing member to further block the escape of lubricant in cooperation with the side rail 50.

Referring again to FIG. 1, an elastomeric sealing member designated generally at 54 is molded to and supported by the radially outer edge of the side rail 50. Sealing member 54 includes a cylindrical wall 56 that is flexibly cantilevered from the side rail 50 and which extends axially inwardly along the outer race surface 16, normally spaced therefrom with a clearance approximately equal to, or slightly less than, the tolerance between the journal block upper surface 38 and the outer race cylindrical surface 16 described above. The normal clearance of the wall 56 from the cylindrical surface 16 allows the clutch 10 to be easily installed between the races 12 and 14, just as does the journal block 36 tolerance, and also substantially prevents rubbing friction with the surface 16. The clearance of the wall 56 is also designed to achieve another objective, described further below. A sealing lip 58 molded to the wall 56 rests very near or in light sealing engagement with the outer race surface 16, at least when the races 12 and 14 are coaxial, as they nominally are in FIG. 1. The invention maintains the wall 56 and lip 58 in that relation, as will appear. It will also be noted in FIG. 1 that the cylindrical wall 56 forms, in cooperation with the side rail 50, an axially inwardly facing chamber 60, for a purpose described below.

Referring now to FIGS. 2 and 7, the high extreme in the eccentric rotation of the outer race 12 is illustrated. For purposes of clear illustration, the lower surface 40 of the journal block 36 is assumed to have remained on the inner race surface 18C as the annular space 11 has widened. Consequently, the distance between the journal block upper surface 38 and the outer race cylindrical surface 16 is shown greater in FIG. 2 than in FIG. 1, and the cross bar 46 has moved to the top of the journal block slot 48. However, it should be understood that the journal block 36 of FIG. 2 could actually rest anywhere between the surfaces 16 and 18C as the annular space 11 widens. It will also be noted in FIG. 2 that the cylindrical wall 56 and the sealing lip 58 are shown in basically the same position relative to the cylindrical surface 16 as they are shown in FIG. 1, with the clearance having remained essentially constant. As may be seen best in FIG. 7, which corresponds to FIG. 2, the cage 43 and the side rail 50 have moved radially outwardly, and the reaction ear 52 has slid up along the cam hook surface 18B. While that movement serves to open up the radially inner gap between the side rail 50 and the inner race 14, that is not a potential leak path, as discussed above, and the wall 56-cylindrical surface 16 relation, at least, has remained essentially the same.

Referring next to FIGS. 1, 3 and 8, the opposite extreme in the eccentric motion of the outer race 12 is shown. Here, the annular space 11 between the race surfaces 16 and 18C has narrowed from that shown in FIG. 1, and the journal block 36 is now confined tightly between the race surfaces 16 and 18C. The cross bar 46 has moved to the bottom of the slot 48. The whole cage 43 has shifted radially inwardly from the FIG. 7 position, and the reaction ear 52 has moved down the cam hook surface 18B. It will be noted that the radially iner gap between the radially inner edge of the second side rail 50 and the inner race 14 has closed up, and the same would be true for the opposed first side rail 44, although not illustrated. In FIG. 3 as well, the clearance between the wall 56 and the surface 16 is shown as having remained substantially constant, despite the eccentric movement of the surface 16. It will be understood by thos skilled in the art that if a constant clearance can be so maintained, then the force with which the lip 58 of the wall 56 is sealingly engageable with the cylindrical surface 16, whether that force be great or small, can also be maintained substantially constant. That sealing force, and the consequent rubbing friction, will then not cyclically increase due to the running eccentricity of the surface 16. The mechanisms that allow and cause that clearance to remain substantially constant will be next described.

Referring now to FIGS. 2 and 3, the invention maintains a substantially constant clearance of wall 56 and lip 58 from surface 16 by taking advantage of the radial float of the cage 43 described above. The sealing member 54 is molded to the second side rail 50, and by virtue of that fact, can radially float with the cage 43. As discussed above, the degree of that radial float is at least equal to, and in fact greater here, than the degree of the running eccentricity of the outer race 12. In addition, the normal clearance of the wall 56 from the outer race surface 16, also discussed above, is sufficiently small that the wall 56, or at least the lip 58 which is part of the wall 56, can pilot or bump on the rapidly eccentrically moving cylindrical surface 16. Bumping engagement between the 56 or lip 58 and the eccentrically moving surface will cause the wall 56, and therefore the whole cage 43 to which it is joined, to continually shift and automatically seek a force balance or equilibrium within the cyclically changing annular space 11. The result is a substantially contant clearance between the wall 56 and surface 16. Thus, as the race 12 moves between the FIGS. 2 and 3 extremes, the wall 56 can stay in the same relation to the cylindrical surface 16. This piloting or bumping of the wall 56 can occur as rapidly as the annular space 11 between the races 12 and 14 cyclically increases and decreases in size, because the the cross bars 46 are movable freely within the journal block slots 48.

Referring next to FIG. 6, it has been explained above that it is the eccentric motion of the outer race 12 that presents the sealing challenge and makes the application of a conventional seal unworkable. However, it is not necessarily the eccentric motion that would be the prime driving force behind the piloting contact or bumping of the sealing member wall 56 or lip 58 on the outer race cylindrical surface 16. Other mechanism could be at work at any particular point in the operation of the overrunning clutch 10, and the sealing member 54 responds to those forces so as to maintain an equilibrium, as well. Vehicle vibrations or other forces may act to disturb the cage 43 and sealing member 54 from a position where they are nominally centered within the annular space 11 between the races 12 and 14, even if the outer race 12 is coaxial to the inner race 14 at that instant. This condition is illustrated in FIG. 6, where the races 12 and 14 are depicted as coaxial, but the cage 43 has radially floated or shifted within the annular space 11 due to some other force. In FIG. 6, the cage 43 has radially shifted sufficiently to resiliently bend or flex the wall 56 against the cylindrical surface 16. The resilience of the wall 56 will help it and the cage 43 to recover to an equilibrium position, back to the constant clearance position of FIG. 1. Thus, the wall 56 and its sealing lip 58 remain at a constant clearance from the cylindrical surface 16 as it eccentrically moves, regardless of the forces that tend to disturb it.

Referring again to FIG. 1, the constant sealing force allows the flow of lubricant out the left side of the annular space 11 between the races 12 and 14 to be further blocked, in cooperation with the side rail 50. Thus, an adequate flow of lubricant follows the path depicted by the arrows. It would be possible to design the lip 58 of the wall 56 with a diameter great enough that it always engaged the surface 16 with a fairly substantial interference, even when the races 12 and 14 were coaxial. Although that would create additional friction, the invention would at least maintain that rubbing friction substantially constant. The invention would thus be useful, in its broadest application, to maintain a static lubricant supply within the annular space between a pair of clutch races in some environment other than a transmission. The embodiment disclosed, however, takes advantage of the dynamic force of the lubricant in the particular transmission environment described above to even further reduce rubbing friction.

Referring next to FIGS. 4 and 5, as centrifugally moving lubricant spirals along the rapidly rotating outer race cylindrical surface 16, it will attempt to exit the left axial side of the annular space 11. It will therefore be captured in the chamber 60, flexing the wall 56 from its FIG. 4 state to that shown in FIG. 5, engaged strongly with the surface 16. Thus, the lip 58 can be designed to only lightly engage or even be spaced from the surface 16 when the rotation of outer race 12 is low and the lubricant force is consequently low. Even if not engaged, the lip 58 will remain in a position where it is sealingly engageable with the cylindrical surface 16. The greater sealing force of FIG. 5, and the consequently greater rubbing friction, will occur only when most needed, that is, when the race 12 is more rapidly rotating. This added friction reducing mechanism of the invention works in conjunction with the constant clearance maintenance already described.

Variations of the preferred embodiment have been suggested by the discussion above. As mentioned, the invention, could be used in a roller clutch in any environment, even one with a static lubricant, although it works particularly well in the transmission environment with its dynamic lubricant forces. A sealing member 54 on both axial sides of the annular space 11 could be used. The amount of nominal or normal sealing wall 56-outer race cylindrical surface 16 clearance could be changed, but the invention will maintain it substantially constant, whatever it may be. In the environment disclosed, the radially inner gap between the cage side rails 44 and 50 and the inner race 14, although significant, does not represent a leak path because of the specifics of the dynamic forces acting on the lubricant for that particular environment. It should be remembered, however, that there is only a small relative circumferential motion between the side rails 50 and 44 and the inner race 14, as seen by comparing FIGS. 7 and 8. Therefore, it would be relatively easy to provide some other low friction seal for the radially inner gap in some other environment whee the radially inner gap did present a potential leak path. The sealing member of the invention would still serve to block the radially outer gap. Therefore, the invention may be embodied in structures other than that disclosed, and is not intended to be so limited.

The embodiments of the invention in which an exclusive property or privilege is claimed are defined as follows:

1. In an overrunning clutch of the type that is installable in an annular space between a pair of relatively rotatable and substantially coaxial races with a lubricant in said annular space, and in which one of said races has a cylindrical surface that moves with a running eccentricity relative to said race coaxes as said races rotate, an improved low friction means for confining said lubricant within said annular space, comprising, a clutch cage installable to the other of said races, said cage being sized relative to said annular space so that a portion of said cage may radially float within said annular space by an amount at least equal to said running eccentricity, a generally annular support member joined to said cage portion near one side of said annular space so as to move with said cage portion and sized so as to substantially block the flow of said lubricant through said one side of said annular space without rubbing on said cylindrical surface, and a sealing member joined to said support member and sealingly engageable with said cylindrical surface so as to further block the flow of lubricant from said side of said annular space in cooperation with said support member, said sealing member, by virtue of being joined to said support member, being also radially flotable and thereby engage said eccentrically moving cylindrical surface in such a way as to prevent an increase in rubbing friction from said running eccentricity.

2. In an overrunning clutch of the type that is installable in an annular space between a pair of relatively rotatable and substantially coaxial races with a lubricant in said annular space, and in which one of said races has a cylindrical surface that moves with a running eccentricity relative to said race coaxis as said races rotate, an improved low friction means for confining said lubricant within said annular space, comprising, a clutch cage installable to the other of said races, said cage being sized relative to said annular space so that a portion of said cage may radially float within said annular space by an amount at least equal to said running eccentricity, a generally annular support member joined to said cage portion near one side of said annular space so as to move with said cage portion and sized so as to substantially block the flow of said lubricant through said one side of said annular space without rubbing on said cylindrical surface, and a sealing member joined to said support member and sealingly engageable with said cylindrical surface so as to further block the flow of lubriant from said side of said annular space in cooperation with said support member, said sealing member including a substantially cylindrical wall normally spaced from said one race cylindrical surface with a clearance sufficiently great to substantially prevent rubbing friction therewith, but sufficiently small that said wall can pilot on said one race cylindrical surface as it eccentrically moves and, by virtue of being joined to said support member, being also radially floatable so as to maintain a substantially constant clearance from said eccentrically moving cylindrical surface and thereby prevent an increase in rubbing friction from said running eccentricity.

3. In an overrunning clutch of the type that is installable in an annular space between inner and outer relatively rotatable and substantially coaxial races, and in which said outer race has a cylindrical surface that moves with a running eccentricity relative to said race coaxis, and in which a lubricant is forcibly directed radially outwardly through said annular space and through said outer race, an improved low friction means for confining said lubricant within said annular space, comprising, a clutch cage installable to said inner race, said cage being sized relative to said annular space so that a portion of said cage can radially float within said annular space by an amount at least equal to said running eccentricity, a generally annular support member joined to said cage portion near one side of said annular space so as to move with said cage portion and sized so as to substantially block the flow of said lubricant through said one side of said annular space without rubbing on said cylindrical surface, and a sealing member including a substantially cylindrical wall flexibly cantilevered to said support member and extending axially inwardly along said outer race cylindrical surface so as to form a lubricant capturing chamber in cooperation with said support member, said wall being normally spaced from said outer race cylindrical surface with a clearance sufficiently great to substantially prevent rubbing friction therewith, but sufficiently small that said wall may be flexed into sealing engagement with said outer race surface by the force of lubricant captured in said chamber to thereby further block the flow of lubricant from said side of said annular space in cooperation with said support member, said clearance also being sufficiently small that said wall can pilot on said outer race cylindrical surface as it eccentrically moves and, by virtue of being joined to said support member, also being radially floatable so as to maintain a substantially constant clearance from said eccentrically moving cylindrical surface and thereby prevent an increase in rubbing friction from said running eccentricity.

* * * * *